Oct. 14, 1958     H. MOORE     2,855,610
METHOD OF MAKING HEADLESS SCREW WITH BROACHED SOCKET
Filed March 29, 1956
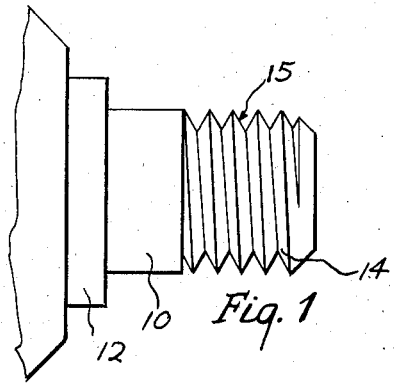
Fig. 1
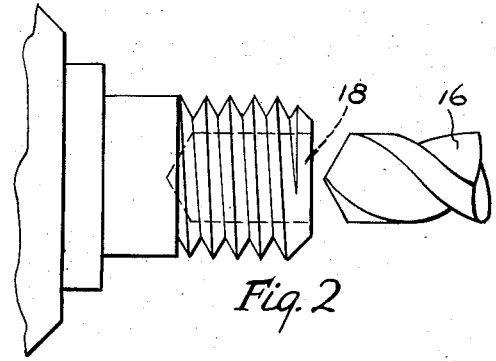
Fig. 2
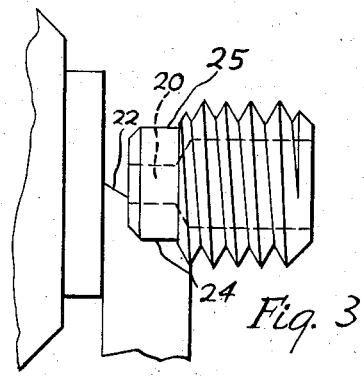
Fig. 3
Fig. 4
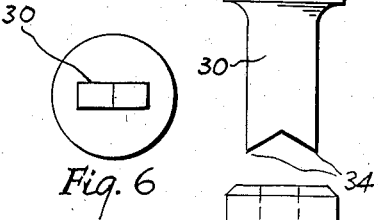
Fig. 6
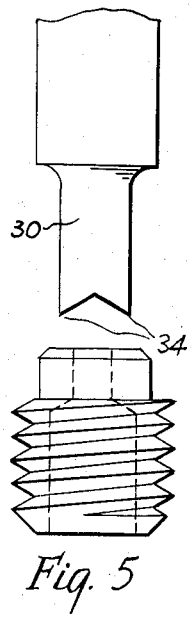
Fig. 5
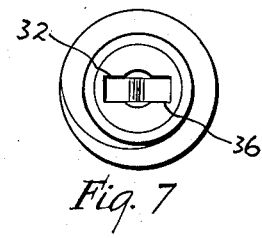
Fig. 7
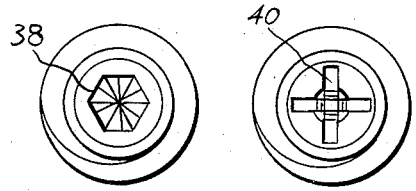
Fig. 8     Fig. 9
INVENTOR
Harrington Moore
by Wright, Brown,
Quinby + May
ATTYS

United States Patent Office 2,855,610
Patented Oct. 14, 1958

2,855,610

METHOD OF MAKING HEADLESS SCREW WITH BROACHED SOCKET

Harrington Moore, East Acton, Mass.

Application March 29, 1956, Serial No. 574,652

1 Claim. (Cl. 10—10)

This invention relates to a method of making headless setscrews having a broached socket in the driving end shaped to receive a driving tool of complemental shape. If a setscrew is drilled at its driving end, after the thread has been cut, and a broach is thereafter forced into the driving end to form a socket of desired shape, the broach usually spreads the metal adjacent to it, thus increasing the outside diameter of the screw at the driving end. In some cases this increase is sufficient to prevent the screw from going all the way into a threaded hole designed to receive it. To avoid this difficulty, according to the invention, after the thread has been cut on the rod stock, the threaded portion of the stock is axially drilled. Prior to or in the process of cutting off the end portion of the stock to sever a screw from the stock, the end portion of the screw adjacent to the cut-off is turned down to form an outside cylindrical surface extending from the cut-off end as far as the socket will extend when made, and having an outside diameter sufficiently less than the root diameter of the thread to allow for expansion to be caused by the broach.

For a more complete understanding of the invention reference may be had to the following description thereof and to the drawing, of which—

Figure 1 is an elevational view of a piece of rod stock in a chuck, an end portion of the stock having been screw-threaded;

Figure 2 is a similar view, showing the end portion drilled axially;

Figure 3 is a forming tool cutting the screw from the rod and shaping part of the screw near the cut, after a second drilling operation;

Figure 4 is an end view of the cut-off screw;

Figure 5 is a side elevaion of the cut-off screw and a broach about to operate on it;

Figure 6 is an end view of the broach shown in Figure 5;

Figure 7 is an end view of the broached screw; and

Figures 8 and 9 are end views, similar to Figure 7, showing broached sockets of other shapes.

The drawing illustrates a sequence of steps by which the invention may be practiced, but the order of some of the steps may be varied.

A piece of rod stock 10 may be held in a suitable chuck 12 while some of the operations necessary for the formation of the screw are performed. A screw thread 14 may be cut in an end portion 15 of the rod extending any desired distance from the extremity of the rod. The end of the rod is then centered and drilled by the use of a drill 16 to form an axial bore 18. When the drill has been withdrawn, an extension 20 of the bore may be drilled with a smaller diameter, coaxial with the bore 18. A portion of the rod 10, including the threaded end portion 15, may then be cut off by a severing tool 22 which may also have a forming portion 24 which is arranged to turn the portion of the screw adjacent to the cut-off end down to an outer cylindrical surface 25 with a diameter slightly less than the root diameter of the thread 14. This is to allow for the radial expansion of this portion of the screw caused by the broaching operation to follow.

When the screw has been cut off from the rod stock 10, a broaching tool 30 is forced into its cut-off end to broach a socket 32 therein adapted to receive a wrench of complemental shape for turning the screw. The broach 30 may be formed with two cutting edges 34 which cut chips from the side walls of the bore extension 20 and curl the chips together as at 36 to form a bottom for the socket.

By using broaches of other shapes, different sockets can be made. For example, a hexagonal socket 38 is shown in Figure 8. Another shape 40 is shown in Figure 9. In each case, the pressure of the broach results in a slight spreading of the surrounding metal, but as this has been allowed for by the reduced diameter of the portion 25, the screw does not bind in a threaded hole.

If a certain amount of frictional binding of the screw in the hole is desired, the turned-down cylindrical portion of the screw is given a slightly greater diameter, say, equal to the root diameter of the screw thread. If the threaded hole into which the screw is introduced is of standard dimensions for the size corresponding to that of the screw, the screw will go all the way into the hole but the portion adjacent to its driving end will have sufficiently tight engagement in the hole to bind the screw frictionally, thus tending to prevent the screw from working loose.

I claim:

Steps in a method of making a socketed headless setscrew which comprise drilling an axial bore in the screw-threaded end of rod stock, drilling a reduced axial extension of said bore, turning down the portion of the rod stock surrounding said reduced extension to an outside diameter slightly less than the root diameter of said screw thread, cutting off the screw from the stock at a point near the end of said reduced extension, and broaching a non-circular recess in from the cut-off end to form a socket within the turned-down portion of the screw, whereby any deformation of said reduced extension caused by the broaching action will be within the outline of the root diameter of said screw thread.

References Cited in the file of this patent

UNITED STATES PATENTS

| | | |
|---|---|---|
| 1,144,425 | Meaker | June 29, 1915 |
| 1,958,705 | Klein | May 15, 1934 |
| 2,086,221 | Gwyn | July 6, 1937 |
| 2,408,267 | Moore | Sept. 24, 1946 |
| 2,446,846 | Noble | Aug. 10, 1948 |
| 2,661,663 | Brinkman | Dec. 8, 1953 |